United States Patent
Richardson et al.

(10) Patent No.: US 6,519,682 B2
(45) Date of Patent: *Feb. 11, 2003

(54) PIPELINED NON-BLOCKING LEVEL TWO CACHE SYSTEM WITH INHERENT TRANSACTION COLLISION-AVOIDANCE

(75) Inventors: Nicholas J. Richardson, La Jolla, CA (US); Charles A. Stack, Del Mar, CA (US)

(73) Assignee: STMicroelectronics, Inc., Carrollton, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,598

(22) Filed: Dec. 4, 1998

(65) Prior Publication Data

US 2002/0069326 A1 Jun. 6, 2002

(51) Int. Cl.⁷ .............................................. G06F 12/08
(52) U.S. Cl. ........................ 711/122; 123/166; 123/169
(58) Field of Search ............................. 711/122, 123, 711/166, 169, 204

(56) References Cited

U.S. PATENT DOCUMENTS

| | | | | |
|---|---|---|---|---|
| 5,214,765 A | * | 5/1993 | Jensen ........................ | 395/425 |
| 5,285,323 A | * | 2/1994 | Hetherington et al. ...... | 395/425 |
| 5,317,718 A | * | 5/1994 | Jouppi ........................ | 395/425 |
| 5,377,341 A | * | 12/1994 | Kaneko et al. ............. | 395/425 |
| 5,642,494 A | | 6/1997 | Wang et al. ................ | 395/467 |
| 5,644,752 A | | 7/1997 | Cohen et al. ............... | 395/449 |
| 5,692,151 A | | 11/1997 | Cheong et al. ............. | 395/467 |
| 5,692,152 A | | 11/1997 | Cohen et al. ............... | 395/467 |
| 5,721,855 A | * | 2/1998 | Hinton et al. .............. | 395/394 |
| 5,768,610 A | * | 6/1998 | Pflum ..................... | 395/800.23 |
| 5,930,819 A | * | 7/1999 | Hetherington et al. ...... | 711/105 |
| 5,958,047 A | * | 9/1999 | Panwar et al. .............. | 712/237 |
| 5,987,594 A | * | 11/1999 | Panwar et al. .............. | 712/216 |
| 6,000,013 A | * | 12/1999 | Lau et al. ................... | 711/119 |
| 6,052,775 A | * | 4/2000 | Panwar et al. .............. | 712/215 |
| 6,081,873 A | | 6/2000 | Hetherington et al. ...... | 711/131 |
| 6,145,054 A | * | 11/2000 | Mehrotra et al. ........... | 711/119 |
| 6,216,234 B1 | * | 4/2001 | Sager et al. ................ | 713/501 |
| 6,226,713 B1 | * | 5/2001 | Mehrotra ................... | 711/109 |
| 6,247,097 B1 | * | 6/2001 | Sinharoy ................... | 711/125 |
| 6,269,426 B1 | * | 7/2001 | Hetherington et al. ...... | 711/122 |

FOREIGN PATENT DOCUMENTS

EP     0 258 559 A2     9/1988

OTHER PUBLICATIONS le;.5qD.W. Clark, B.W. Lampson, and K.A. Pier, "The Memory System of a High–Performance Personal Computer," IEEE Transactions on Computers, vol. C–30, No. 10, Oct. 1981, pp. 715–733.

J.H. Edmondson, P. Rubinfeld, R. Preston and V. Rajagopalan, "Superscalar Instruction Execution in the 21164 Alpha Microprocessor," IEEE Micro, vol. 15, No. 2, Apr. 1995, pp. 33–43.

* cited by examiner

Primary Examiner—Reba I. Elmore
(74) Attorney, Agent, or Firm—Lisa K. Jorgenson; William J. Kubida

(57) ABSTRACT

A cache subsystem in a data processing system is structured to place the L1 cache RAMs after the L2 cache RAMs in the pipeline for processing both CPU write transactions and L1 line-fill transactions. In this manner the lines loaded into the L1 cache are updated by all CPU write transactions without having to perform any explicit checks. The present invention also places the L1 tag RAM before the L1 data RAM for both CPU write transactions and L1 line-fill transactions, such that CPU write transactions may check that a line is in the L1 cache before updating it. L1 line-fill transactions can then check that the line to be transferred from the L2 cache to the L1 cache is not already in the L1 cache.

20 Claims, 6 Drawing Sheets

|  | t0 | t1 | t2 | t3 | t4 | t5 | t6 | t7 | t8 | t9 |
|---|---|---|---|---|---|---|---|---|---|---|
| L2 REQUEST | ⊢──⊣ • CPU Read Request | | | | | | | | | |
| L2 ISSUE | | ⊢─a─⊣⊢a⊕16⊣ • Transaction Misses L1 cache is sent to L2 cache | | | | | | | | |
| L2 TAG | | | ⊢─a─⊣⊢a⊕16⊣ • L2 cache tag RAM accessed | | | | | | | |
| L2 DATA | | | | ⊢─a─⊣⊢a⊕16⊣ • L2 cache data RAM accessed | | | | | | |
| L1 TAG | • output from L2 cache sent to L1<br>• read l1 tag in t4 for hit/miss check...then | | | | ⊢─a─⊣⊢a⊕16⊣ | • write l1 tag in t5 if l1 miss in t4 | | | | |
| L1 DATA | • write line to l1 data RAM in t5,6 if L2 hit in t3, L1 miss in t4<br>• data output to CPU in t5 | | | | | ⊢──⊣⊢──⊣ | | | | |

*FIG. 5*

|  | t0 | t1 | t2 | t3 | t4 | t5 | t6 | t7 | t8 | t9 |
|---|---|---|---|---|---|---|---|---|---|---|
| L2 REQUEST | ⊢──⊣ • CPU write Request | | | | | | | | | |
| L2 ISSUE | | | ⊢──⊣ • data rotated from right-alignment to byte alignment<br>• Transaction sent to L2 cache | | | | | | | |
| L2 TAG | | | | ⊢──⊣ • L2 cache tag RAM accessed | | | | | | |
| L2 DATA | | | | | • write data to L2 cache data RAMs (if L2 hit)<br>⊢──⊣ | | | | | |
| L1 TAG | | | | • read L1 tag to determine if to write to L1 cache (on hit)<br>⊢──⊣ | | | | | | |
| L1 DATA | | | | | • write selected bytes to L1 cache data RAM if L2 hit in t3, L1 hit in t4<br>⊢──⊣ | | | | | |

*FIG. 6*

PIPELINED NON-BLOCKING LEVEL TWO CACHE SYSTEM WITH INHERENT TRANSACTION COLLISION-AVOIDANCE

BACKGROUND OF THE INVENTION

1. Field of the Invention

The present invention relates to a cache subsystem in a data processing system that resolves conflicts which may arise due to the interaction of central processing unit (CPU) read transactions, CPU write transactions, and line-fill transactions in a two (2) level non-blocking cache system. Due to the non-blocking nature of such caches more than one such transaction can be in progress at the same time. This can give rise to read-miss/write-miss and read-miss/read-miss conflicts.

More particularly, when a CPU write transaction is initiated shortly before or after a CPU read transaction, both can be active in the cache subsystem at the same time. If both transactions miss the level one (L1) cache and hit the level (L2) cache, and each of them uses the same line in memory, it is possible for the following sequence of events to occur. First, the CPU read transaction is initially processed by the L1 cache and since the read misses the L1, an L1 line-fill operation is initiated to transfer a line of data from the L2 cache to the L1 cache. Second, the CPU write transaction is then processed by the L1 cache, and since the line of data (same as that for the previous read) in which it resides is still not in the L1 cache, it misses the L1 cache and is passed on to the L2 cache. Third, the L1 line-fill transaction (generated by the L1 read-miss) places the requested line from the L2 cache into the L1 cache. Fourth, the write transaction then updates the addressed line in the L2 cache, after the old version of that same line has been placed in the L1 cache by the previous L1 line-fill.

It can be seen that this scenario would result in the line in the L1 cache not being updated with data from the most recent write transaction, such that if data from that line was later requested from the L1 cache via a CPU read transaction it would result in stale data being returned to the CPU.

Further, when a CPU read transaction is initiated shortly before or after another CPU read transaction, both can be active in the cache system at the same time. If both transactions miss the L1 cache and hit the L2 cache, and each of them uses the same memory address, then they will both generate an L1 line-fill transaction that attempts to load the same line from the L2 cache into the L1 cache. This can cause harmful effects if the L1 cache is a multi-way cache, which would allow the same line to be loaded into two different locations in the L1 cache, giving rise to coherency problems if the CPU later attempts to modify that line via a CPU write cycle. Since the L1 cache is normally incapable of modifying two copies of the same line simultaneously, one copy would end up containing stale data that could be returned to the CPU on a subsequent CPU read.

2. Description of Related Art

Conventional systems do not address the problems described herein in the same manner. Other systems typically use explicit conflict detection techniques, such as the addition of comparators to determine when read/write (R/W) transactions are attempting to use the same address in the memory system (caches and/or main memory).

For CPU write transactions in a typical cache system, the L1 cache is only accessed before the L2 cache, not after. If the L1 cache is hit then there is no problem, but if the transaction misses the L1 cache then there is the possibility of an L1 read-miss/write-miss conflict, as described above. To avoid this, the address of each new CPU write transaction is explicitly checked (compared) against the address of any L1 line-fill transaction (caused by the L1 read-miss) in progress to ensure that there is no conflict before allowing the write-transaction to proceed. If there is a conflict, then the CPU write transaction is stalled until the L1 line-fill is completed and the conflict thus resolved.

Similarly, to avoid L1 read-miss/read-miss conflicts in conventional systems, the address of each new CPU read transaction is explicitly checked (compared) against the address of any L1 line-fill transaction (caused by a previous L1 read-miss) in progress to ensure that it does not conflict before allowing the read transaction to proceed. If it does conflict, then the CPU read transaction is either stalled until the line-fill is completed and the conflict thus resolved (the second CPU read will then get an L1 hit when allowed to proceed), or is marked as invalid so that it will not generate another L1 line-fill.

Therefore, it can be seen that a need exists for a data processing system having a cache subsystem (CSS) that is structured to avoid collisions between read/write transactions issued by the central processing unit independent of the order, or sequence in which they are issued. Further, a system that provides the previously described functions without the need for additional complexity, such as comparator circuits, or other logic would be highly desirable.

SUMMARY OF THE INVENTION

In contrast to the prior art, the present invention provides a five (5) stage memory access transaction pipeline which sequentially places the L1 cache after the L2 cache.

Broadly, the present invention is a cache subsystem in a data processing system structured to place the L1 cache RAMs after the L2 cache RAMs in the pipeline for processing both CPU write transactions and L1 line-fill transactions. In this manner it is naturally guaranteed that lines loaded into the L1 cache are updated by all CPU write transactions without having to perform any explicit checks. The present invention also places the L1 tag RAM before the L1 data RAM for both CPU write transactions and L1 line-fill transactions, such that CPU write transactions may check that a line is in the L1 cache before updating it, and L1 line-fill transactions may check that the line to be transferred from the L2 cache to the L1 cache is not already in the L1 cache.

BRIEF DESCRIPTION OF THE DRAWINGS

FIG. 5 is a timing diagram that shows the pipeline flow of a CPU read transaction that misses the L1 cache;

FIG. 6 is another timing diagram that shows the pipeline flow of a CPU write transaction that updates first the L2 cache and then the L1 cache.

DETAILED DESCRIPTION OF THE PREFERRED EMBODIMENTS

Figure 1:
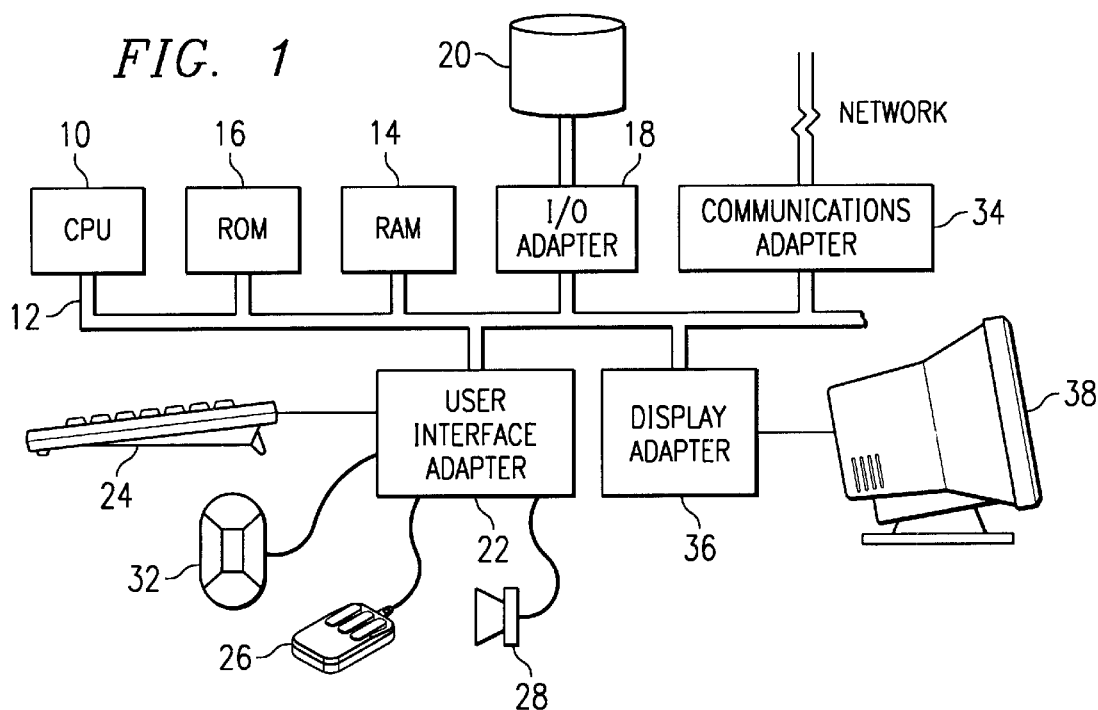
FIG. 1 is a block diagram of the basic components of a data processing system capable of implementing the present invention.

A two (2) level cache system is one in which a small, fast cache (the level one; L1 cache) is connected to a slower, larger cache (the level two; L2 cache). When the CPU reads or writes data from or to a memory location the cache system first tests to see if the data belonging to that location is in the L1 cache. If it is, then the data is provided or updated quickly by the L1 cache. If the data is not in the L1 cache, this is defined as an L1 read or write miss. The data is then provided or updated by the L2 cache, although this update occurs more slowly. In the case of an L1 read-miss the line containing the requested data is also transferred from the L2 cache to the L1 cache (this is known as an L1 line-fill) so that it may be provided more quickly the next time the CPU accesses this line. If the data is not in the L2 cache, this is defined as an L2 miss, and the line containing the requested data is fetched from main memory and then loaded into the L2 cache (known as an L2 line-fill) for faster access the next time this line is requested by the CPU.

A pipelined cache is a multi-level (i.e. L1/L2) cache that breaks up the processing of CPU read, CPU write, and line-fill transactions into sequential stages such that each pipeline stage may be simultaneously processed as part of a different transaction, thus increasing concurrent activity and throughput.

A non-blocking cache is a cache system which does not require that a CPU read or write transaction that misses the L1 or L2 cache prevent subsequent CPU transactions, that either hit or miss the L1 or L2 cache, from being serviced. Specifically, if the L1 cache can process new transactions immediately after one or more previous transactions have received an L1 miss and are still being processed by the L2 cache or external memory, then the L1 cache is non-blocking. Similarly, if the L2 cache can process new transactions immediately after one or more previous transactions have received an L2 miss and are still being processed by external memory, then the L2 cache is non-blocking. The present invention requires that only the L1 cache be non-blocking, although in many actual cache implementations both the L1 and L2 caches are non-blocking.

A tag RAM is the portion of the L1 or L2 cache that contains the address of every line contained in that cache. Every time a read or write transaction accesses the cache(s), the tag RAMs are checked to see if they contain the line having an address that matches the address of the read or write transaction, thus determining whether the required line is in the cache. The tag RAM may also determine the status of the line based upon a specific memory protocol, such as the MESI (modified, exclusive, shared, invalid) protocol.

The data RAM is the portion of the L1 or L2 cache that contains the actual data belonging to each line of memory that currently resides in the cache.

A CPU read transaction is a request by the CPU to read data from a location in the memory system, which is subsequently processed by the cache subsystem. As used herein memory system will include the entire information storage system in the data processing system, i.e. main memory, L1 cache, L2 cache. The cache subsystem will be referred to herein as the L1/L2 caches and any corresponding logic. Depending on where the line containing the requested data item resides, it may be provided by the L1 cache, the L2 cache, main memory or a combination of the foregoing. In the current implementation, the size of the data requested may be 1, 2, 4, or 8 bytes.

A CPU write transaction is a request by the CPU to write data to a memory location, which is subsequently processed by the cache subsystem. Depending on where the line containing the requested data item resides, it may be updated in the L1 cache, the L2 cache, or main memory. In the current implementation, the size of the data to be written may be 1, 2, 4, or 8 bytes. An L1 line-fill transaction is a transaction that takes a line of data which resides in the L2 cache and places it in the L1 cache. This is typically initiated by a CPU read transaction that misses the L1 cache and hits the L2 cache, causing the line that contains the data being read to be transferred from the L2 cache to the L1 cache. An L2 line-fill transaction is a transaction that takes a line of data which resides in main memory and places it in the L2 cache. This is typically initiated by a CPU read or write transaction that misses both the L1 and the L2 caches, causing the line that contains the data being read or written to be transferred from main memory to the L2 cache.

A cache line is a fixed number of bytes that defines the smallest unit of data which can be transferred between the L1 and L2 caches, or between the L2 cache and main memory, and which is always aligned on an address boundary equal to its size. In the current embodiment the line size is 32 bytes, and all lines are therefore aligned on 32-byte boundaries.

Referring to FIG. 1, a typical data processing system is shown which may be used in conjunction with the present invention. A central processing unit (CPU) 10, such as an Intel Pentium microprocessor, commercially available from Intel Corporation is provided and interconnected to the various other system components by a system bus 12. However, it should be noted that other types of microprocessors, such as the PowerPC microprocessor commercially available from IBM Corporation and Motorola Corp., the Alpha microprocessor available from Compaq Corporation and the SPARC microprocessor available from Sun Microsystems are also capable of implementing the techniques disclosed herein and contemplated by the present invention. Read only memory (ROM) 16 is connected to CPU 10 via bus 12 and includes the basic input/output system (BIOS) that controls the basic computer functions. Random access memory (RAM) 14, I/O adapter 18 and communication adapter 34 are also connected to system bus 12. I/O adapter 18 may be a small computer system interface (SCSI) adapter that communicates with a disk storage device 20. Communications adapter 34 interconnects bus 12 with an outside network enabling the data processing system communicate with other such systems. User input/output devices are also connected to system bus 12 vias user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through keyboard 24, trackball 32 or mouse 26 receiving output from the system via speaker 28 and display 38. Additionally, an operating system (OS) such as DOS, OS/2, Windows 95, Windows NT, or the like is used to coordinate the functions of the various components shown in FIG. 1.

Figure 2:
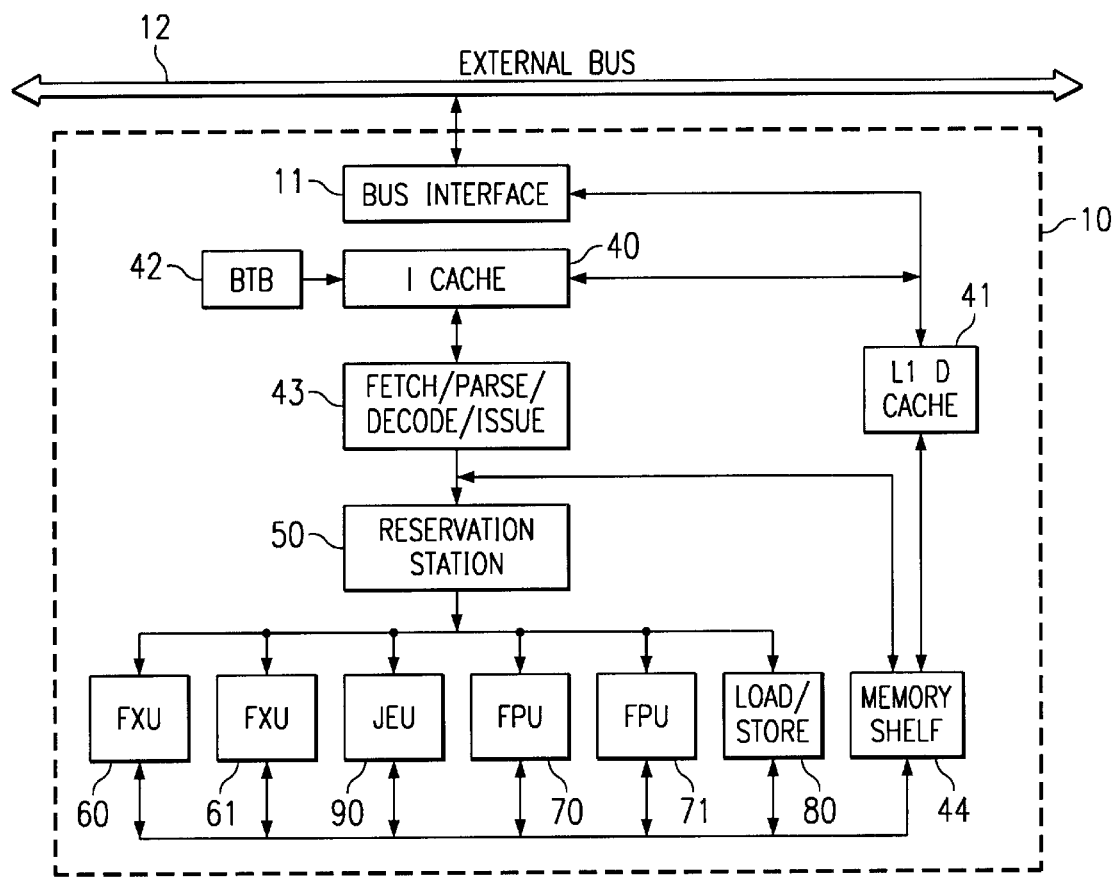
FIG. 2 is a block diagram of a microprocessor which can be used in conjunction with the present invention.

In FIG. 2, bus 12 is shown and which is considered to be external of microprocessor 10. It should be noted that for the sake of simplicity, microprocessor 10 will also be interchangeably referred to herein as CPU 10.

Bus interface unit (BIU) 11 interfaces the microprocessor components with system bus 12. Main memory 14 and the various input/output devices 26, 28, 32, via adapter 22, are also connected to bus 12. Control, address and data information is transmitted from microprocessor 10 onto bus 12 via BIU 11. Further, control, address and data signals from memory 14 and I/O adapter 22 are received by BIU 11 for use by microprocessor 10. It should be noted that the control, address and data information will include microprocessor instructions, as well as operand data which will be manipulated by the instructions.

Microprocessor 10, like most modern microprocessors, includes a hierarchical memory subsystem. The memory subsystem usually includes a level one (L1) instruction cache 40 and L1 data cache 41 which provide the instructions and data to the execution units (FPU 70, 71, Integer Unit 60, 61 and Load/Store unit 80). In many data processing systems, an off chip level two (L2) cache (not shown) is provided. While an L2 cache is smaller than main memory 14, retrieving information likely to be used by the processor from an L2 cache is much faster than loading the information from main memory. Main memory 14 is the last level of storage in the memory system. Memory 14 is the largest storage area, but also requires the greatest number of cycles to be accessed by the microprocessor.

More particularly, L1 instruction cache 40 is included in microprocessor 10, as shown in FIG. 2. After retrieving the instructions from main memory 14, cache 40 stores these microprocessor instructions that will be provided to the microprocessor execution units.

An L1 data cache 41 is also provided, as shown in FIG. 2, and may be configured to run in write-through mode, write-back mode, or the like. Write-through cache architectures require that all writes to the cache also update external memory simultaneously. A write-back architecture allows data to be written to the cache without updating external memory. With a write-back cache external write cycles are only required when a cache miss occurs, a modified line is replaced in the cache, or when an external bus master requires access to data. Typical L1 data caches use a four-way set associative architecture and a least recently used (LRU) algorithm. Depending on the cache architecture, the line size of cache 41 may be 8 bytes, 16 bytes, 32 bytes, or the like, and new lines are only allocated during memory read cycles. Valid status is then maintained on a 32 byte cache line basis when line is replaced in the cache. The CPU can access the cache in a single internal clock cycle for both reads and writes. As noted above, instructions and data are stored separately in the L1 cache in order to increase performance.

Memory shelf 44 is essentially a memory queue that stores data after it has been received from the memory subsystem and prior to it being written from the execution units to the memory subsystem. Memory shelf 44 also includes a snooping mechanism that ensures coherency of data throughout the memory subsystem.

A branch target buffer 42 is used to predict the target address of control transfer instructions such as a "branch" or "jump" instruction. That is, the target address is precalculated (predicted) and stored in buffer 42. Thus, when an unconditional branch is taken, or a conditional branch instruction is encountered, the address for the next (non-sequential) instruction is already known and available for use by the corresponding execution unit (e.g. floating point or integer).

For example, a Pentium type microprocessor uses dynamic branch prediction. As each prefetched instruction is passed into the dual instruction pipelines, the memory address it was fetched from is used to perform a lookup in the BTB 42, which is a high-speed lookaside cache. If there is a branch and it misses BTB 42, it is predicted as not taken and the prefetch path is not altered. If a hit occurs in the BTB 42, then the state of history bits in BTB 42 are used to determine whether the branch should be predicted as taken or not taken. When the branch is executed, its results (whether it was taken or not and, if taken, the branch target address) are used to update BTB 42. The branch target buffer makes its predictions on the basis of basic blocks, i.e. block size, block type, target address and whether the branch will be taken or not taken. If the branch is incorrectly predicted, the instructions in the pipeline(s) and those which are currently-active and have been prefetched, must be flushed.

Instruction cache 40 is connected to an instruction fetch/parse/decode/issue unit 43 and provides the microprocessor instructions to reservation station 50 and ultimately to execution units 60, 61, 70, 71, 80 and 90.

As noted by its name fetch/parse/decode/issue unit 43 performs several functions. First, it retrieves the instructions and loads them into an internal buffer by "prefetching" them from the instruction stream prior to their being fetched. As the fetched instructions are dispatched through the pipeline, new instructions are loaded into the buffer. This ensures that the execution units will always have a continuous supply of instructions and prevents any "bubbles" from occurring in the pipeline. Unit 43 also parses the complex instruction set computer (CISC) instructions into segments and identifies boundaries between the individual instructions. The parsed instructions are then decoded into reduced instruction set computer (RISC) instructions, or micro-ops, which are then placed in a decoded instruction queue to be subsequently issued to the execution units. It should be noted that in some cases the CISC instructions will be translated into more than one RISC instruction. However, in other cases one CISC instruction will correspond to a single RISC instruction.

As noted above, in addition to being fetched by unit 43, the instructions are also decoded and issued, or dispatched. From the fetch/parse/decode/issue unit 43, the instructions are then provided to centralized reservation station 50 which provides instructions to the six (6) execution units. Centralized reservation station 50 will be, for example, approximately 20–24 entries deep and will store instructions which are awaiting execution on one of the execution units.

The microprocessor of FIG. 2 shows six (6) execution units and includes two (2) fixed point units (FXU) having reference numerals 60, 61 respectively, which may also be referred to herein as integer units (IU). Integer instructions, such as add (ADD), multiply (IMUL), move (MOV) and the like are also issued by unit 43 to integer units 60, 61. In addition to executing other fixed point instructions and performing integer calculations, Integer units 60, 61 may perform address calculations for the load and store instructions.

Floating point units 70 and 71 (FPU) perform the floating point operations and calculations that are often required for scientific and technical applications. Additionally, the floating point units execute the multimedia extensions (MMX) to the Intel architecture. Floating point units 70 and 71 receive the issued floating point instructions from unit 43 for execution thereon. The floating point units 70, 71 include eight 80 bit registers with a 64 bit interface which are capable of parallel execution. The exemplary Intel architecture floating point unit 70, 71 uses the x87 instruction set and is compatible with IEEE standard 754.

Load/store unit 80 is also included which is responsible for executing the load instructions which provide information (data and instructions) from the memory system to the microprocessor pipeline. Store instructions are also included which write information from the microprocessor to the memory system. For example, load/store instructions are issued to load/store unit 80 for execution and memory address calculation, and to memory shelf 44, which may include a memory control unit, or the like, for scheduling. Load/store functions are implemented by load/store unit 80 which executes load and store instructions on one or more arithmetic logic units (ALU). Load/store unit 80 may include separate ALUs for load and store instructions. Load and store instructions include load string (LODS), load task register (LTR), move data (MOV), and the like. Store instructions include store task register (STR), store string (STOS), and the like. Generally, load instructions retrieve data and/or instructions from cache/memory and place the information in one of the microprocessor registers, while store instructions place data and/or instructions into a cache/memory location from the microprocessor registers. In some cases integer units 60, 61 may be used to perform memory address calculations.

A jump execution unit (JEU) 90 is also shown in FIG. 2, which is also often referred to as a branch execution unit. Jump execution unit 90 will process control transfer instructions such as branches, jumps and moves. Typically, when a jump instruction is encountered, JEU 90 will evaluate a condition code and jump to an out of sequence instruction based upon the state of the condition. In some cases the jump will occur if the condition is true, other times a branch will be taken when the condition is false. If the condition is such that the branch is not taken, then execution of instructions will continue sequentially. A typical jump, or branch instruction will include an opcode that describes the type of instruction, e.g. branch conditional, branch conditional to count register, delayed branch, jump on equal/zero, jump on not overflow, jump on parity even, or the like. The instruction also includes a field that specifies which bit in a condition register, or flag register (in the case of Intel architecture) is to be used for the condition of the jump, or branch. The target address is also included in the instruction such that if the condition is met, then the instruction stream jumps to the specified address for next instruction to be executed.

The condition codes are bits in the condition register or flag register that are set during execution of other instructions. Generally, the condition codes include greater than, less than, equal to or overflow. When, for example, a compare instruction (CMP) is executed the "equal to" bit will be set to logical 1 when the contents of two registers are equal. The next jump on equal (JE) instruction will then look at the equal bit. If the "equal to" bit is a one, indicating that the contents of the compared registers were equal to one another, then the jump is taken and the next instruction is fetched from the target address in the jump instruction. If the equal bit is a logical zero, then the jump is not taken and the next instruction sequentially after the jump instruction is executed.

Memory management is provided by calculating a physical address from an effective address using a particular addressing mode. The CPU then uses the physical address to actually address specific locations in the physical memory device(s). A memory management unit includes a translation lookaside buffer (reference 33, FIG. 3), which is a cache for the paging mechanism. In a typical microprocessor, similar to the one shown in FIG. 2, the translation lookaside buffer (TLB) is a page table cache that automatically keeps the most commonly used page table entries in the processor. An address calculation unit is also provided for memory management operations and is used to calculate the physical address by computing an offset address (effective address). Generally, the effective address is calculated by adding together up to three values: a base, an index and a displacement. The base, if present, is the value in one of the 32 bit general registers at the time of the execution of the instruction. The index is also a value contained in one of the 32 bit general purpose registers. The index differs from the base in that the index is first multiplied by a scale factor of 1, 2, 4 or 8 before the summation is made. The third component added to the memory address calculation is the displacement which is a value of up to 32 bits which is supplied as part of the instruction.

For additional information see the Intel Architecture Software Developer's Manual, Volume 2, Instruction Set Reference, published by Intel Corp., 1997; and Pentium Pro and Pentium II System Architecture, second edition, published by MindShare, Inc., 1998, both hereby incorporated by reference.

Figure 3:
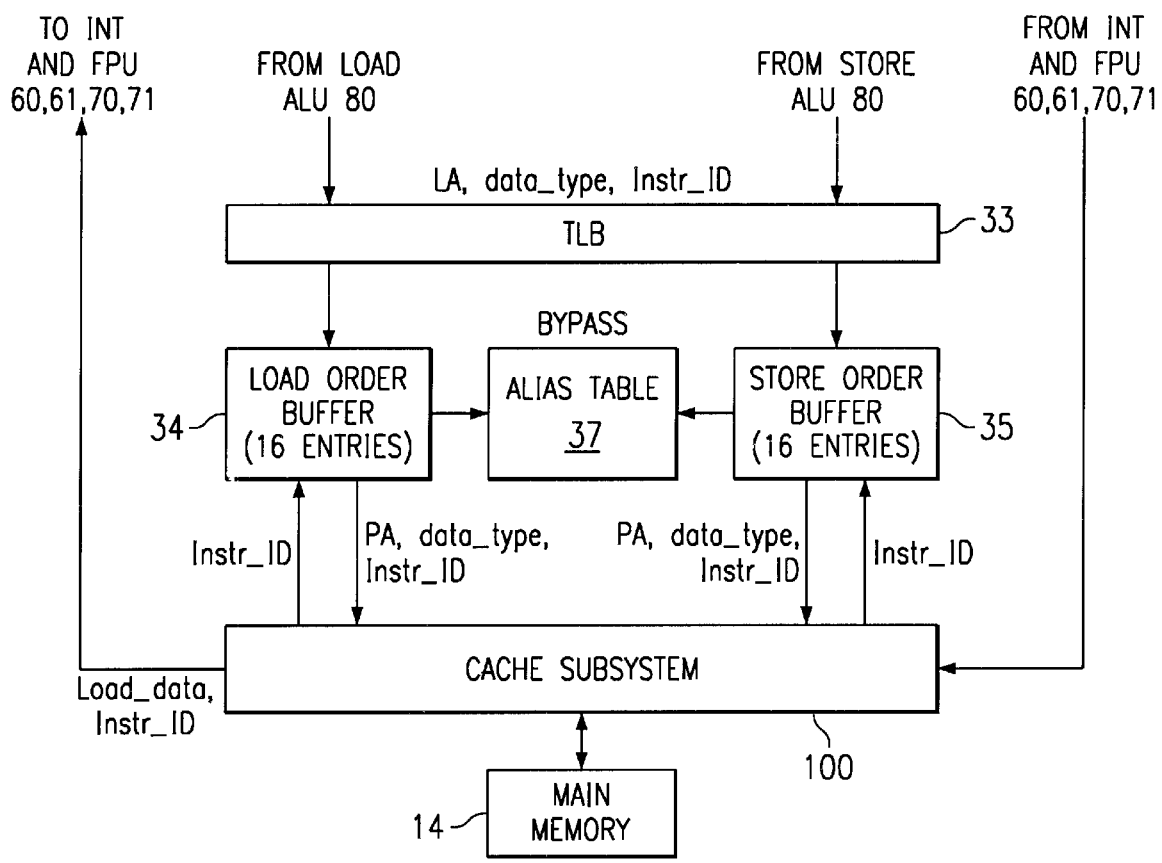
FIG. 3 is another block diagram of the interface between the cache subsystem of the present invention and the microprocessor execution units.

Referring to FIG. 3, a load/store buffer is shown that includes TLB 33 which calculates the physical address of data to be accessed in the memory system. Load order buffer 34 is connected to TLB 33 and receives the physical address from which data is to be retrieved and then loaded into microprocessor 10 by load/store unit 80. Store order buffer 35 is also connected to TLB 33 and receives the physical addresses where data is to be stored from microprocessor 10.

Load order buffer 34 will provide the address, data type and an instruction identifier to the cache subsystem (CSS) 100. Further, load buffer 34 will then receive the instruction identifier, back from the cache subsystem 100 to indicate that this particular transaction has been completed and the corresponding instruction can be removed from the load buffer. The actual data to be stored is then provided by one of the execution units (e.g. FXU 60, 61; FPU 70, 71) to the cache subsystem 100.

Store order buffer 35 will provide the address, data type and an instruction identifier to CSS 100. Store buffer 35 will also receive the instruction identifier back from the cache subsystem indicating that the particular transaction has been completed and the corresponding instruction can be removed from the store buffer. The load data is provided with the instruction identifier from CSS 100 to the execution unit that requested the data to be loaded.

It can be seen that CSS 100 is connected to receive the store data from the execution units and place it in the address generated by TLB 33. Similarly, CSS 100 will retrieve data from the address provided by TLB 33 and load it into the requesting execution unit. Main memory 14 is also shown in FIG. 3 and connected to CSS 100 such that data can be stored to or and/or loaded from the memory.

Alias table 37 determines which instructions/transactions can bypass one another. That is, a first load transaction awaiting data to be loaded to specific memory address may be sequentially ahead of a second load transaction which is retrieving data that is already stored at another memory address. In this case, alias table 37 can allow the second load transaction to be processed before the first load transaction. Further, under certain circumstances, table 37 may allow write transactions from CSS 100 to bypass load transactions in the load buffer 34.

Figure 4:
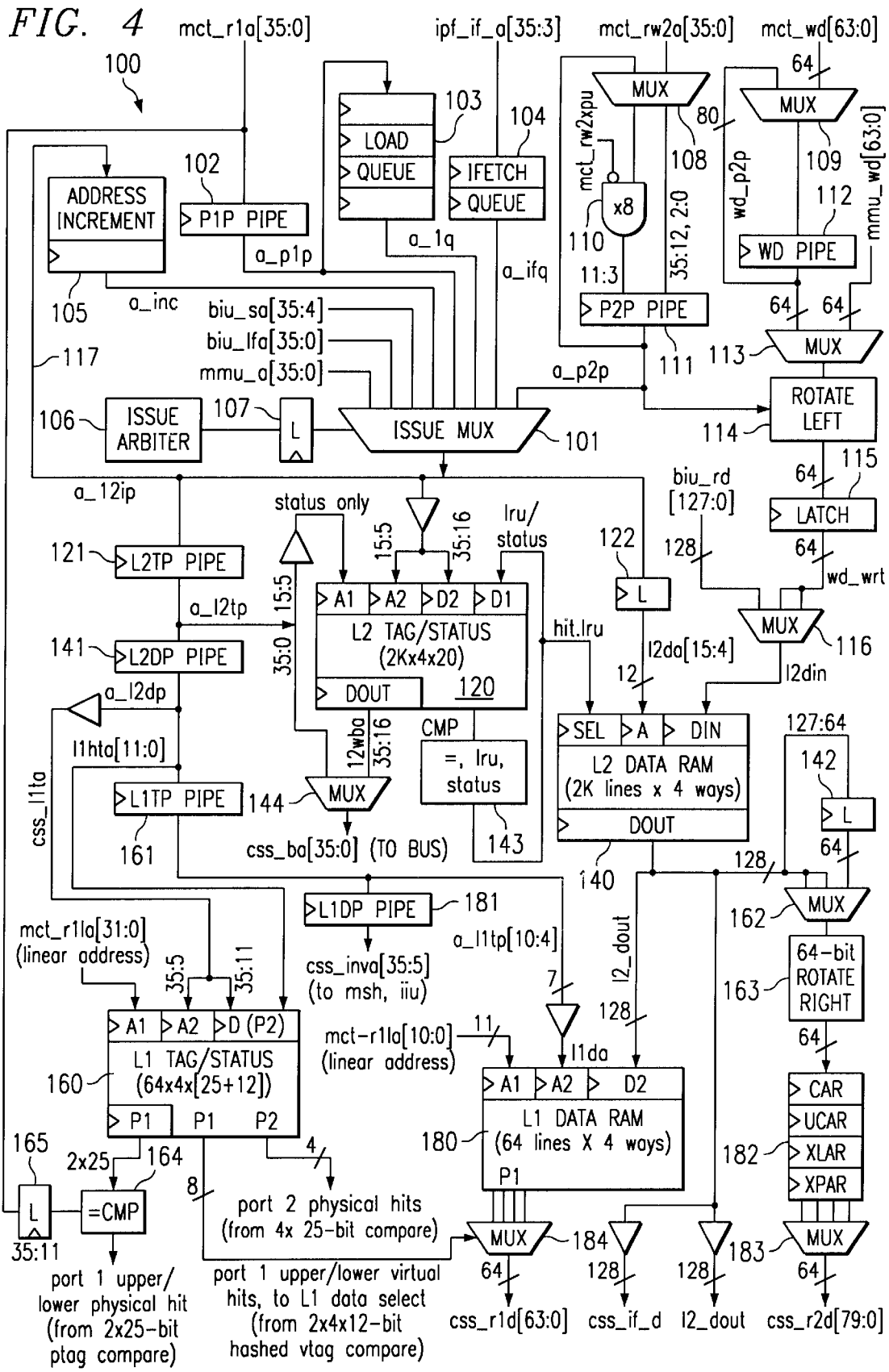
FIG. 4 is a block diagram showing the arrangement of the cache subsystem components as a five stage pipeline in accordance with the present invention.

Referring to FIG. 4, a more detailed view of cache subsystem 100 including the pipeline stages of the present invention is shown and will now be described.

The block diagram of this embodiment of the present invention is shown in FIG. 4 and includes a 5-stage pipeline comprising the Issue stage, the L2 Tag stage, the L2 Data stage, the L1 Tag stage, and the L1 Data stage. The pipeline can receive CPU transactions on either one of two input ports (reads only on port 1, and both reads and writes on port 2), but all CPU read transactions that miss the L1 cache on port 1, and all port 2 read transactions, are sent down the 5-stage pipeline to be processed first by the L2 cache and then by the L1 cache.

Furthermore, all write transactions are received on port 2 and are always sent down the pipeline to be processed first by the L2 cache and then by the L1 cache. In this manner, the L1 cache implements a write-through policy, meaning that it never contains modified lines of data that are more up-to-date than those same lines in either the L2 cache or external memory. Use of a write-through policy for the L1 cache simplifies its structure (allowing port 1 to be a read-only port instead of a read/write port), and has no performance penalty provided the L2 cache has sufficient bandwidth to process all CPU write transactions. In this implementation, the L2 cache can process a new CPU write transaction every clock cycle (same as the L1 cache) and therefore no significant performance penalty for the L1 write-through architecture is present. The above details notwithstanding, the techniques utilized by this preferred embodiment of the present invention avoids L1 read-miss/write-miss conflicts and L1 read-miss/read-miss conflicts in the same manner as described elsewhere herein. It should be noted that if the architecture were implemented with a write-back-policy L1 cache instead of a write-through-policy L1 cache then the main difference to the behavior of the system would be that CPU write transactions would first be checked against the L1 cache on port 1, and if they received a hit would update the L1 cache without being sent down the 5-stage pipeline.

Memory access to the cache subsystem is organized as a five (5) stage pipeline. The first stage is the issue stage where the read and write requests are issued to the cache. Stage 2 is the level two (L2) tag stage which determines if the requested data is present in the L2 data cache. The L2 data access is the third stage in the pipeline, and the level one (L1) tag lookup is the fourth stage. Finally, stage 5 is the L1 data access. It can be seen that the cache system of the present invention is organized such that requests to the L2 cache are handled before requests to the L1 cache. The present invention also places the L1 tag RAM before the L1 data RAM for both CPU write transactions and L1 line-fill transactions, such that CPU write transactions may check that a line is in the L1 cache before updating it, and L1 line-fill transactions may check that the line to be transferred from the L2 cache to the L1 cache is not already in the L1 cache.

More specifically, at stage 1, an issue multiplexer 101 (MUX) is provided that receives various read and write requests from functional units (BIU, MMU, Load/Store) on the microprocessor. A port one (P1) latch 102 is provided for holding cache access requests from the microprocessor, as well as any requests from the L1 tag unit 160. When multiple requests are present, load queue 103 stores the requests prior to their being provided to MUX 101. Instruction fetch queue 104 receives instructions for placement into the L1 instruction cache. Address increment unit 105 will input the next sequential address back to issue MUX 101 in the case where blocks of data, residing at sequential addresses are to be accessed. Arbiter unit 106 controls the output of MUX 101 by awarding ownership of bus 117 to the input unit (102–105) having the highest arbitration status. Latch 107 holds the arbitration control signal prior to its input to issue MUX 101. Additionally, other units, such as the bus interface unit and memory management unit also provide input requests to issue MUX 101.

A write data pipeline is also shown which receives write data into MUX 109 and read or write requests into MUX 108. The data is output from MUX 108 either directly to a port 2 (P2) pipeline latch 111, or through an AND gate 110 to P2 latch 111. The read and/or write requests can then be provided to issue MUX 101 or back to read/write (R/W) input MUX 108. Write data from MUX 109 is provided to write data latch 112. The data is then multiplexed with data from the memory management unit in multiplexer 113. Data from both the P2 pipeline latch 111 and MUX 113 is then aligned in preparation for input to the L2 data random access memory (RAM) by rotate left unit 114. Subsequent to its alignment, the rotated data is clocked into latch 115 and then provided to MUX 116, which multiplexes the data with a read data signal from the bus interface unit. Subsequently, the data is input to L2 data RAM 140 at its data input port.

Requests are latched from bus 117 into L2 tag latch 121 at the same time they are provided to L2 tag/status 120. Further, the requests are provided to latch 122 and subsequently to L2 data RAM 140. After latch 121, the request is provided to MUX 144, along with output data from L2 tag 120. From multiplexer 144, the tag information is then provided back to the cache subsystem. The output of latch 121 is also provided to L2 tag 120 to provide status information relating to the request. A comparator 143 is provided which determines the least recently used (LRU) status for corresponding cache lines in L2 data RAM 140. For L2 cache hits, the LRU signal is provided to a selector in L2 data RAM 140, which causes the oldest data to be the first to be overwritten when new data is provided to the L2.

When an L2 cache hit occurs, data is output from L2 data RAM 140 to L1 data RAM 180 (L1 line fill operation). The data is also then latched into a synchronizing latch 142 and provided to multiplexer 162. The data is then byte aligned by 64-bit rotate right unit 163. An output queue 182 is then provided for storing the data from rotate right unit 163 before outputting it to MUX 183.

Subsequent to latch 121, the request is stored in latch 141. From this latch, the request is provided to L1 tag/status RAM 160, as well as the L1 tag/status latch 161. L1 tag/status 160 then compares the tags for the corresponding L1 data to determine if a hit or a miss has occurred. Comparator 164 determines if a hit was based on the physical address of the data and then provides a signal to latch 165. This control signal is then provided back to the PI latch 102. L1 tag/status 160 provides a control signal to a data select multiplexer 184 which outputs data to the microprocessor.

From latch 161, the request is provided to the L1 data RAM 180, as well as the L1 data latch 181. Subsequent to latch 181, the request is invalidated, since it has progressed through the five stage pipeline of the present invention.

It should be noted that FIG. 4 represents only one preferred embodiment of the present invention. Those skilled in the art will understand that other configurations of a five stage pipeline which accesses the L2 cache prior to the L1 cache are possible and contemplated by the scope of the present invention.

The operation of the present invention will now be described in conjunctions with the previously discussed elements in FIGS. 1–4.

Organizing the L1 and L2 caches into a specific pipelined structure solves both of the previously described problems (i.e. read-miss/write-miss conflict and read-miss/read-miss conflict). This pipeline structure will include one pipeline stage that contains the L2 tag RAM 120, the next sequential pipeline stage contains the L2 data RAM 140, the next sequential stage contains the L1 tag RAM 160, and the final sequential stage contains the L1 data RAM 180. Thus for any given transaction that involves both caches, the L2 cache RAMs 120, 140 are always accessed before the L1 cache RAMs 160, 180, and all types of transactions must flow in the same sequential order down the pipeline.

The present invention solves the L1 read-miss/write-miss conflict by ensuring that both transactions are sequentially processed first by the L2 cache and then by the L1 cache in that order. If the L1 read-miss transaction is the first to be issued into the pipeline, followed by the L1 write-miss transaction, then the CPU read will first cause the addressed line to be transferred from the L2 data cache 140 to the L1 data cache 180 (using an L1 line fill operation). The L1 write-miss transaction will then update the line in both the L2 and the L1 caches, the line thus ending in the correct state in both caches. Conversely, if the L1 write-miss is the first to be issued into the pipeline, followed by the L1 read-miss, then the line will first be updated in the L2 data cache 140 by the write transaction, and then subsequently transferred to the L1 data cache 180 by the read transaction. Thus, in this case as well, the correct state of the data is in both the L1 and L2 caches.

The L1 read-miss/read-miss conflict is also solved by the pipelined organization of the present invention. That is, since the L1 tag RAM 160 always appears in the pipeline before the L1 data RAM 180, each L1 read-miss that transfers a line from the L2 data cache 140 to the L1 data cache 180 can first check the L1 tag RAM 160 to see if that line has already been loaded into the L1 data cache 180 by a previous L1 read-miss. If the line has been loaded, then the second L1 line-fill will be cancelled, thus avoiding duplication of the same line in the L1 cache. Otherwise the new line will be loaded into the L1 data cache 180 as normal.

To summarize, the key elements of the present invention include: (1) placing the L1 cache RAMs 160, 180 after the L2 cache RAMs 120, 140 in the pipeline for processing both CPU write transactions and L1 line-fill transactions such that it is naturally guaranteed that lines loaded into the L1 data 180 cache are updated by all CPU write transactions without having to perform any explicit checks; and (2) placing the L1 tag RAM 160 before the L1 data RAM 180 for both CPU write transactions and L1 line-fill transactions, such that CPU write transactions may check that a line is in the L1 data cache 180 before updating it (common to most cache systems), and L1 line-fill transactions may check that the line to be transferred from the L2 data cache 140 to the L1 data cache 180 is not already in the L1 data cache 180 (which is unique to the present invention).

Conventional, pipelined non-blocking caches do not place the L1 cache after the L2 cache in the pipeline for all transactions that involve both caches. Therefore, for CPU write transactions in a typical cache system, the L1 cache is only accessed before the L2 cache, rather than after. If the L1 cache receives a hit then there is no problem, but if it receives an L1 miss then there is the possibility of an L1 read-miss/write-miss conflict as described above. To avoid this, the address of each new CPU write transactions is explicitly checked against the address of any L1 line-fill transaction (caused by the L1 read-miss) in progress to ensure that there is no conflict before allowing the write-transaction to proceed. If there is a conflict, then the CPU write transaction is stalled until the L1 line-fill is completed and the conflict thus resolved.

Similarly, to avoid L1 read-miss/read-miss conflicts in conventional systems, the address of each new CPU read transaction is explicitly checked (compared) against the address of any L1 line-fill transaction (caused by a previous L1 read-miss) in progress to ensure that it does not conflict before allowing the read transaction to proceed. If it does conflict, then the CPU read transaction is either stalled until the line-fill is completed and the conflict thus resolved (the second CPU read will then get an L1 hit when allowed to proceed), or is marked as invalid so that it will not generate another L1 line-fill.

One advantage of the pipelined organization of the present invention is that no CPU read or write transaction has to be delayed when an address conflict arises. Both L1 read-miss/write-miss and L1 read-miss/read-miss conflicts are naturally resolved by the pipelined structure as previously described without the need for stalling the transactions, thus allowing the full bandwidth of the caches to be exploited in all circumstances. Another advantage is the simplicity of the present invention. That is, no address comparators are required to detect the conflicts described here, so both the number of gates required and the complexity of the control logic is substantially reduced.

FIG. 5 shows the pipeline flow of a CPU read transaction that misses the L1 cache, retrieves the line containing the requested data from the L2 cache, and is loaded into the L1 cache (L1 line-fill) provided it does not already reside there.

FIG. 6 shows the pipeline flow of a CPU write transaction that updates first the L2 cache and then the L1 cache.

The present invention permits any combination of these pipelined transactions to be processed back-to-back by the cache pipeline in any order without any explicit conflict detection, even when they access the same memory lines.

Referring to the flowcharts of FIGS. 7A and 7B, a preferred embodiment of the present invention will now be described in more detail in conjunction with FIG. 4. It was previously noted that the L1 cache is a multi-port cache (dual port in a preferred embodiment). In accordance with the present invention, the CPU will initially check the L1 tag RAM on Port 1 for the data to be read. If there is a miss, then the transaction proceeds down the pipeline of the present invention. Further, all read and/or write requests on Port 2 are sent down the pipeline. This configuration allows the read-miss/write-miss and read-miss/read-miss conflicts to be avoided, as will be described in more detail below. In a preferred embodiment, write transactions are always provided to Port 2, while read transactions can be sent to either Port 1 or Port 2. For read transactions, an initial check of the L1 cache is implemented by the CPU on Port 1 and if a miss occurs, then the read transaction is sent down the pipeline. Subsequent to determining if an L1 miss has occurred the CPU will reschedule the read/write transaction and cause those transaction with miss the L1 cache to be processed by the 5 stage pipeline of the present invention.

The following description of Flowcharts 7A and 7B are provided to demonstrate the flow of transactions in a system implementing the novel structure of the present invention. It should be understood that the conflict avoidance/resolution discussed herein is addressed by this system structure and architecture rather than additional control elements and logic which would be added to a conventional memory system. That is, in a system embodying the structure of the present invention, conflicts between read-miss/write transactions and read-miss/read-miss transactions are automatically resolved by the architecture itself, without the need of additional specialized control logic elements, or the like.

Figure 7A:
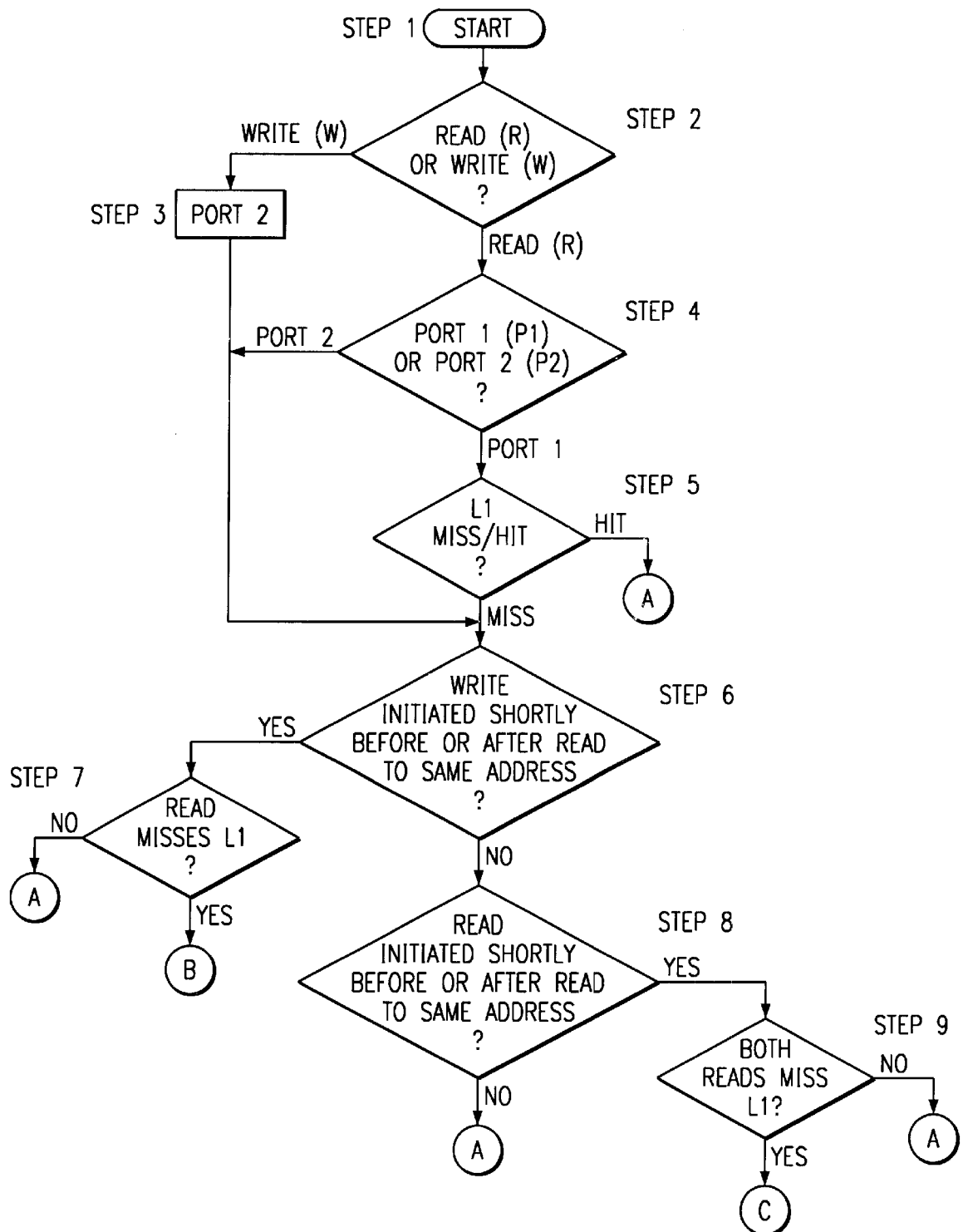
FIGS. 7A and 7B are flowcharts representing the operation of a preferred embodiment the present invention.
Figure 7B:
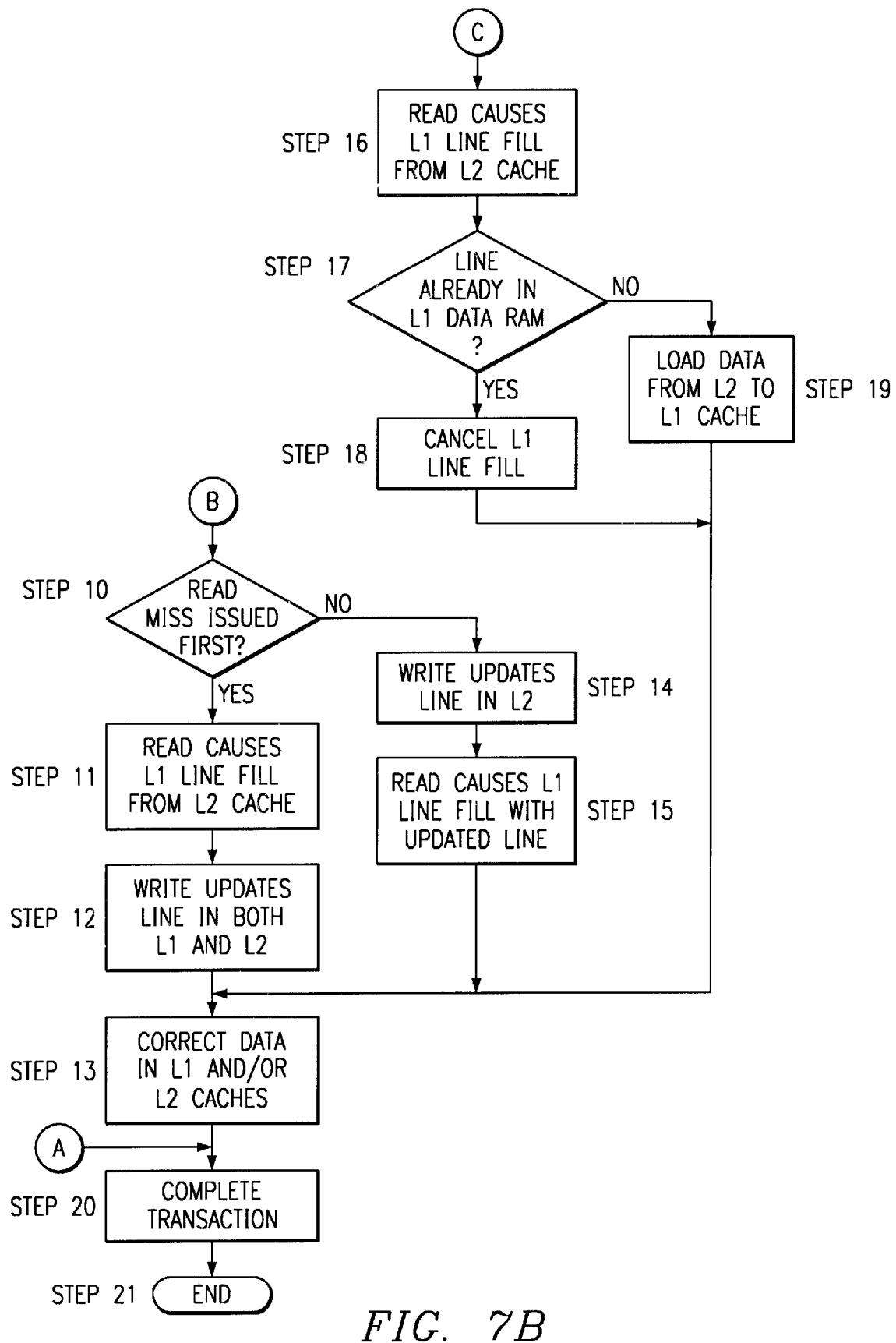

At step 1 of FIG. 7A, the process of the present invention starts and step 2 indicates if the transaction is a read or a write transaction. If the transaction is a write, then it will be present at Port 2 (step 3) since the architecture of the present invention causes all writes to be on Port 2. Read transactions are input to either Port 1 or Port 2. Step 4 determines whether the read transactions are input to Port 1 or Port 2. If, the read transaction is input to Port 1, then step 5 provides an indication as to whether an L1 miss has occurred such that the transaction is a read-miss. If, at step 5 an L1 hit occurs then the process proceeds to step 20 to complete the transaction (load the data from the L1 to the CPU).

However, when an L1 miss occurs, the transaction proceeds to the pipeline of the present invention at step 6. Additionally, subsequent to step 3 (write transaction on Port 2) and step 4 (read transaction on Port 2), the transaction also continues to step 6.

Step 6 indicates when a potential read-miss/write-miss conflict may occur due to both transactions being in the pipeline simultaneously. More particularly, step 6 checks if the write transaction was initiated shortly before or after a read transaction to the same memory address. If so, the transaction flow depends on whether the read transaction has missed the L1 cache (step 7). It should be noted that an indication was provided regarding the existence of an L1 cache hit/miss (step 5) for read transactions on Port 1. However, an L1 cache hit/miss determination will not have been made for other read transactions that may have been issued at Port 2. Therefore, a second L1 hit/miss determination is utilized (step 7). If the read transaction has missed the L1 cache, then the process continues to step 10 where an indication is provided regarding whether the read-miss transaction preceded the write transaction. If so, then at step 11, the read-miss will be input to the L2 tag RAM and when an L2 hit occurs (if the data is in main memory an L2 line fill will need to occur prior to the L1 line fill) an L1 line fill operation will be implemented that provides the data from the L2 data RAM 140 to the L1 data Ram 180 and updates the L1 tag RAM 160. In this manner the line of data requested by the read transaction is supplied to the L1 cache. Next, at step 12, the subsequent write transaction updates this line of data in the L1 cache and L2 cache such that the correct data is in both the L1 and L2 caches (step 13).

If at step 10, the write transaction occurred before the read-miss transaction, then at step 14 the write updates the corresponding line in the L2 cache by first looking at the L2 tag RAM 120 and then actually updating the line in L2 data RAM 140. The read-miss transaction then causes and L1 line fill operation to occur by first determining from the L2 tag RAM 120 that the cache line is in the L2 data RAM 140. The cache line is then written to the L1 data RAM 180 and L1 tag RAM 160 is updated accordingly. Therefore, independent of whether the read-miss or write is the first transaction, the present invention causes the correct data to be present in both the L1 and L2 caches (step 13).

If step 6 indicates that a potential read-miss/write-miss conflict will not occur, then the process continues to step 8 where the possibility that a read-miss/read-miss conflict could occur, due to read transaction being active simultaneously in the pipeline, is evaluated. Specifically, at step 8 an indication is provided when a first read transaction is initiated shortly before or after another read transaction that attempts to access the same address in the memory system as the first read transaction. Based on the criteria in step 8, if a read-miss/read-miss conflict does not occur, then the process continues to step 20 where the transaction is completed. If step 8 indicates a read transaction is close to another read transaction and both are attempting to access the same address, then step 9 will indicate whether both of the read transactions have missed the L1 cache. If at step 9 at least one read hits the L1 cache, then the process continues to step 20 and the transaction completes normally. However, if at step 9, both of the read transactions miss the L1 cache, the process of the present invention continues to step 16 where the first read-miss transaction causes an L1 line fill operation to occur. More particularly, the L2 tag RAM 120 is accessed and when the data is present in the L2 cache (for an L2 miss the data will be provided from main memory to the L2 cache prior to the L1 line fill operation), the cache line is retrieved from L2 data RAM 140 and provided the L1 data RAM 180. L1 tag RAM is then updated accordingly. Prior to completion of the L1 line fill operation, step 17 checks whether the corresponding cache line is already present in the L1 cache by accessing the L1 tag RAM 160, which is positioned in the 5 stage pipeline of the present invention before the L1 data RAM 180. In this manner, the L1 cache can be checked for the requested data prior to the L1 line fill operation actually completing. If the cache line is already in the L1 data RAM 180, then the L1 line fill operation is cancelled at step 18. However, if the cache line is not in the L1 cache, then the cache line is loaded from the L2 data RAM 140 to L1 data RAM 180. Thus, the pipeline organization of the present invention prevents the same cache line from being present in different ways of a multi-way cache. The present invention prevents the situation where the same cache line is written in different ways of the same cache, thereby, giving rise to the potential problem of one line being updated and the other becoming stale.

Subsequent to step 13 where the correct data is in the L1 and/or L2 caches, the transaction is completed at step 20 and the process of the present invention then ends at step 21.

It can be seen that the pipeline structure of the present invention allows the read-miss/write and read-miss/read-miss conflicts to be avoided without the need for additional comparison logic and/or intentionally stalling the system.

Although certain preferred embodiments have been shown and described, it should be understood that many changes and modifications may be made therein without departing from the scope of the appended claims.

What is claimed is:

1. A memory system comprising:
   a non-blocking cache subsystem, including:
      an L1 cache and an L2 cache organized as a pipeline capable of processing concurrent operations, said L2 cache occurring before said L1 cache in said pipeline;
      means for receiving at least one read and one write transaction from a CPU;
      means for generating an L1 cache line fill operation to transfer a line of information from a specific memory address in said L2 cache to said L1 cache when said read transaction misses said L1 cache; and
      means for causing said write transaction to update the L2 cache, on an L2 cache hit to said specific memory address, before updating the L1 cache on an L1 cache hit;
      wherein the L1 cache is automatically updated with valid write information provided by said write transaction when said line fill operation and said write transaction are processed concurrently by said pipeline and access said line of information from said specific memory address in said L2 cache regardless of the order in which said pipeline processes said L1 cache line fill operation and said write transaction.

2. A memory system according to claim 1 wherein said L1 cache includes a first input port and a second input port.

3. A memory system according to claim 2 wherein all said read transactions input to said first input port that miss said L1 cache are provided to said pipeline.

4. A memory system according to claim 3 wherein all said read transactions input to said second input port are provided to said pipeline.

5. A memory system according to claim 4 wherein all said write transactions input to said second input port are provided to said pipeline.

6. A memory system according to claim 5 wherein said pipeline comprises:
an L2 tag memory and an L2 data memory included in said L2 cache; and
an L1 tag memory and an L1 data memory included in said L1 cache.

7. A memory system according to claim 6 wherein said pipeline comprises stages having a sequential order of said L2 tag memory, said L2 data memory, said L1 tag memory and said L1 data memory.

8. A memory system comprising:
a non-blocking cache subsystem, including:
an L1 cache having a tag RAM structure and a data RAM structure and an L2 cache organized as a pipeline capable of processing concurrent operations, said L2 cache occurring before said L1 cache in said pipeline;
means for receiving at least one read or write transaction from a CPU;
means for generating an L1 cache line fill operation to transfer a line of information from said L2 cache to said L1 cache when said read transaction misses said L1 cache; and
means for checking said L1 cache tag RAM when processing the L1 cache line fill operation and for canceling said L1 cache line fill operation when said L1 cache tag RAM indicates said line of information is valid and present in said L1 cache data RAM due to a previous L1 cache line fill operation updating said L1 cache.

9. A memory system comprising:
a non-blocking cache subsystem including:
an L1 cache having a tag RAM structure and a data RAM structure and an L2 cache organized as a pipeline capable of processing concurrent operations, said L2 cache occurring before said L1 cache in said pipeline;
means for receiving a first and a second read transaction from a CPU;
means for generating a first L1 cache line fill operation to transfer a line of information from a specific memory address in said L2 cache to said L1 cache when said first read transaction misses said L1 cache;
means for generating a second L1 cache line fill operation to transfer a line of information from said specific memory address in said L2 cache to said L1 cache when said second read transaction misses said L1 cache; and
means for checking said L1 cache tag RAM when processing said second L1 cache line fill operation and for canceling said second L1 cache line fill operation when said line of information is valid and present in said L1 cache data RAM due to said first L1 cache line fill operation updating said L1 cache.

10. A memory system comprising:
a non-blocking cache subsystem, including:
an L1 cache having a tag RAM structure and a data RAM structure and an L2 cache organized as a pipeline capable of processing concurrent operations, said L2 cache occurring before said L1 cache in said pipeline;
means for receiving a first and a second read transaction from a CPU;
means for receiving a write transaction from said CPU;
means for generating a first L1 cache line fill operation to transfer a line of information from a specific memory address in said L2 cache to said L1 cache when said first read transaction misses said L1 cache;
means for generating a second L1 cache line fill operation to transfer a line of information from said specific memory address in said L2 cache to said L1 cache when said second read transaction misses said L1 cache;
means for checking said L1 cache tag RAM when processing the second L1 cache line fill operation and for canceling said second L1 cache line fill operation when said line of information is valid and present in said L1 cache data RAM due to said first L1 cache line fill operation updating said L1 cache; and
means for causing said write transaction to update the L2 cache, on an L2 cache hit to said specific memory address, before updating the L1 cache on an L1 cache hit;
wherein the L1 cache is automatically updated with valid write information provided by said write transaction when said first L1 cache line fill operation and said write transaction are processed substantially concurrently by said pipeline and access said specific memory address in said L2 cache regardless of the order in which said pipeline processes said first L1 cache line fill operation and said write transaction.

11. A method of processing data in a computer system comprising the steps of:
providing a CPU and a non-blocking cache subsystem including an L1 cache having a tag RAM structure and a data RAM structure and an L2 cache organized as a pipeline capable of processing concurrent operations, said L2 cache occurring before said L1 cache in said pipeline;
receiving a first and a second read transaction from said CPU;
receiving a write transaction from said CPU;
generating a first L1 cache line fill operation to transfer a line of information from a specific address in said L2 cache to said L1 cache when said first read transaction misses said L1 cache;
generating a second L1 cache line fill operation to transfer a line of information from a specific address in said L2 cache to said L1 cache when said second read transaction misses said L1 cache;
checking said L1 cache tag RAM when processing the second L1 cache line fill operation and canceling said second L1 cache line fill operation when said line of information is valid and present in said L1 cache data RAM due to said first L1 cache line fill operation updating said L1 cache;
causing said write transaction to update the L2 cache, on an L2 cache hit to said specific memory address, before updating the L1 cache on an L1 cache hit; and
automatically updating the L1 cache with valid write information provided by said write transaction when said first L1 cache line fill operation and said write transaction are processed substantially concurrently with and access said specific memory address in said L2 cache regardless of the order in which said pipeline processes said first L1 cache line fill operation and said write transaction.

12. A method according to claim 11 further comprising the step of providing said L1 cache with a first input port and a second input port.

13. A method according to claim 12 further comprising the step of providing to said pipeline all said read transactions input to said first input port that miss said L1 cache.

14. A method according to claim 13 further comprising the step of providing to said pipeline all said read transactions input to said second input port.

15. A method according to claim 14 further comprising the step of providing to said pipeline all said write transactions input to said second input port.

16. A non-blocking cache subsystem for a data processing system organized as a sequential stage pipeline, comprising:
    an issue stage issuing read, write, and line-fill transactions as sequential stages that can be processed concurrently within the pipeline;
    a level two cache linked to the issue stage;
    a level one cache linked to the issue stage downstream in the pipeline from the level two cache for processing the read, write, and line-fill transactions after the transactions are processed by the level two cache, wherein the level one cache is configured to process additional ones of the read, write, and line-fill transactions after one of the processed transactions is determined to be a level one cache miss and while the level one cache miss transaction is being processed by the level two cache or by an external memory.

17. The non-blocking cache subsystem of claim 16, wherein the level one cache comprises tag memory and data memory, the tag memory being positioned before the data memory within the level one cache for the write transactions and the line-fill transactions.

18. The non-blocking cache subsystem of claim 17, wherein the level two cache comprises tag memory and data memory, the tag memory being positioned before the data memory within the level two cache.

19. A two-level cache system, comprising:
    an L2 cache for processing processor read and write transactions, wherein the L2 cache is arranged for sequential processing of the transactions and includes an L2 tag memory positioned upstream of an L2 data memory; and
    an L1 cache linked to the L2 cache for processing the processor read and write transactions after the processing of the transactions by the L2 cache, wherein the L1 cache is smaller and faster than the L2 cache and is arranged for sequential processing of the transactions and includes an L1 tag memory positioned upstream of an L1 data memory and further wherein ones of the transactions determined to be L1 cache misses are further processed by the L2 cache concurrently with the L1 cache processing additional ones of the transactions.

20. The cache subsystem of claim 19, wherein the L1 cache including a port to the L1 tag memory for receiving the processor read transactions prior receipt by the L2 cache and wherein the processor read transactions received on the port and determined to be L1 cache misses are transferred to the L2 cache for sequential processing by the L2 cache and then the L1 cache.

* * * * *